(12) United States Patent
Cherkasova et al.

(10) Patent No.: US 9,772,886 B2
(45) Date of Patent: Sep. 26, 2017

(54) OPTIMIZING EXECUTION AND RESOURCE USAGE IN LARGE SCALE COMPUTING

(71) Applicant: HEWLETT-PACKARD DEVELOPMENT COMPANY, L.P., Houston, TX (US)

(72) Inventors: Ludmila Cherkasova, Sunnyvale, CA (US); Zhuoyao Zhang, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 64 days.

(21) Appl. No.: 14/825,987

(22) Filed: Aug. 13, 2015

(65) Prior Publication Data
US 2015/0355951 A1   Dec. 10, 2015

Related U.S. Application Data

(62) Division of application No. 13/752,229, filed on Jan. 28, 2013, now Pat. No. 9,152,469.

(51) Int. Cl.
*G06F 9/46*   (2006.01)
*G06F 9/50*   (2006.01)

(52) U.S. Cl.
CPC .......... *G06F 9/5083* (2013.01); *G06F 9/5066* (2013.01)

(58) Field of Classification Search
CPC ....................................................... G06F 9/50
See application file for complete search history.

(56) References Cited

U.S. PATENT DOCUMENTS

| 8,935,702 | B2 | 1/2015 | Harris et al. | |
|---|---|---|---|---|
| 2008/0086442 | A1* | 4/2008 | Dasdan | G06F 17/30584 |
| 2011/0191361 | A1 | 8/2011 | Gupta et al. | |
| 2012/0084789 | A1 | 4/2012 | Iorio | |
| 2012/0131591 | A1 | 5/2012 | Moorthi et al. | |
| 2012/0226639 | A1 | 9/2012 | Burdick et al. | |

OTHER PUBLICATIONS

Lim, H. et al.; "Stubby: a Transformation-based Optimizer for Mapreduce Workflows"; Aug. 27-31, 2012; vol. 5; Issue 11; http://arxiv.org/pdf/1208.0082.pdf.

Tian, F. et al.; "Towards Optimal Resource Provisioning for Running Mapreduce Programs in Public Clouds"; 2011; pp. 155-162; http://www.cs.wright.edu/~keke.chen/papers/predict-mr.pdf.

Yoo, D. et al.; "A Locality Enhanced Scheduling Method for Multiple MapReduce Jobs in a Workflow Application"; 2012; vol. 24; Http://www.ipcsit.com/vol24/29-icica2012-a0074.

\* cited by examiner

*Primary Examiner* — Emerson Puente
*Assistant Examiner* — Steven Do
(74) *Attorney, Agent, or Firm* — Fabian VanCott

(57) ABSTRACT

A method for tuning workflow settings in a distributed computing workflow comprising sequential interdependent jobs includes pairing a terminal stage of a first job and a leading stage of a second, sequential job to form an optimization pair, in which data segments output by the terminal stage of the first job comprises data input for the leading stage of the second job. The performance of the optimization pair is tuned by determining, with a computational processor, an estimated minimum execution time for the optimization pair and increasing the minimum execution time to generate an increased execution time. The method further includes calculating a minimum number of data segments that still permit execution of the optimization pair within the increased execution time.

13 Claims, 11 Drawing Sheets

| Read Phase Microbenchmarks | | | Collect Phase Microbenchmarks | | |
|---|---|---|---|---|---|
| Row number $j$ | Data MB $Data_{read}$ | Time msec $T_{read}$ | Row number $j$ | Data MB $Data_{collect}$ | Time msec $T_{collect}$ |
| 1 | 16 | 2010 | 1 | 8 | 1210 |
| 2 | 16 | 2020 | 2 | 8 | 1350 |
| ... | ... | ... | ... | ... | ... |

Notation Summary

| | |
|---|---|
| $T_{i,i+1}(N_R^{J_i})$ | Completion time of $(J_i, J_{i+1})$ with $N_R^{J_i}$ reduce tasks |
| $R_{i,i+1}(N_R^{J_i})$ | Resource usage of pair $(J_i, J_{i+1})$ with $N_R^{J_i}$ reduce tasks |
| $T_W(s)$ | Completion time of the entire workflow $W$ with setting $s$ |
| $R_W(s)$ | Resource usage of the entire workflow $W$ with setting $s$ |
| $T_{i,i+1}^{min}$ | Minimal completion time of a job pair $(J_i, J_{i+1})$ |
| $N_R^{J_i,min}$ | Number of reduce tasks in $J_i$ that leads to $T_{i,i+1}^{min}$ |
| $w\_increase$ | Allowed increase of the min workflow completion time |
| $N_R^{J_i,incr}$ | Number of reduce tasks in $J_i$ to meet the increased time |

*Fig. 6A*

Algorithm 1

1: for $i \leftarrow 1$ to $n$ do
2: $\quad T_{i,i+1}^{incr} = T_{i,i+1}^{min} \times (1 + w\_increase)$
3: $\quad N_R^{J_i,cur} \leftarrow N_R^{J_i,min}$
4: $\quad$ while $T_{i,i+1}(N_R^{J_i,cur}) < T_{i,i+1}^{incr}$ do
5: $\quad\quad N_R^{J_i,cur} \leftarrow N_R^{J_i,cur} - 1$
6: $\quad$ end while
7: $\quad N_R^{J_i,incr} \leftarrow N_R^{J_i,cur}$
8: end for

*Fig. 6B*

Algorithm 2

1: $s^{cur} = s^{min} = \{N_R^{J_1,min}, ..., N_R^{J_n,min}\}$
2: $T_{w\_incr} = T_W(s^{min}) \times (1 + w\_increase)$
3: for $i \leftarrow 1$ to $n$ do
4:     $N_R^{J_i,incr} \leftarrow N_R^{J_i,min}$
5: end for
6: while true do
7:     $bestJob = -1$, $maxGain = 0$
8:     for $i \leftarrow 1$ to $n$ do
9:         $N_R^{J_i,tmp} \leftarrow N_R^{J_i,incr} - 1$
10:         $s^{tmp} = s^{cur} \cup \{N_R^{J_i,tmp}\} - \{N_R^{J_i,incr}\}$
11:         if $T_W(s^{tmp}) \leq T_{w\_incr}$ then
12:             $Gain = \frac{R_W(s^{min}) - R_W(s^{tmp})}{T_W(s^{tmp}) - T_W(s^{min})}$
13:             if $Gain > MaxGain$ then
14:                 $maxGain \leftarrow Gain$, $bestJob \leftarrow i$
15:             end if
16:         end if
17:     end for
18:     if $bestJob = -1$ then
19:         break
20:     else
21:         $N_R^{bestJob,incr} \leftarrow N_R^{bestJob,incr} - 1$
22:     end if
23: end while

*Fig. 6C*

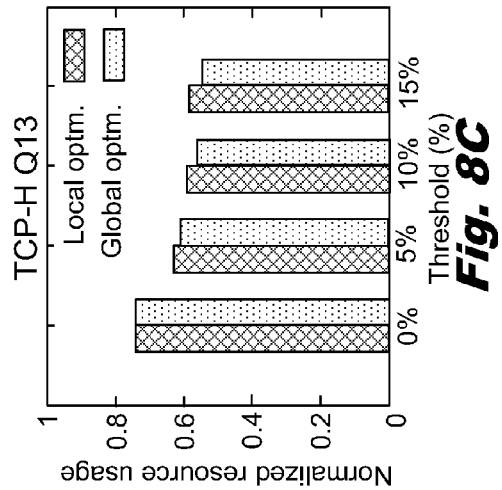
Fig. 8A TCP-H Q1
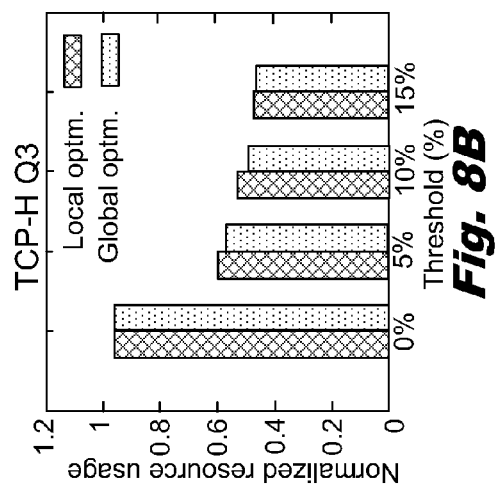
Fig. 8B TCP-H Q3
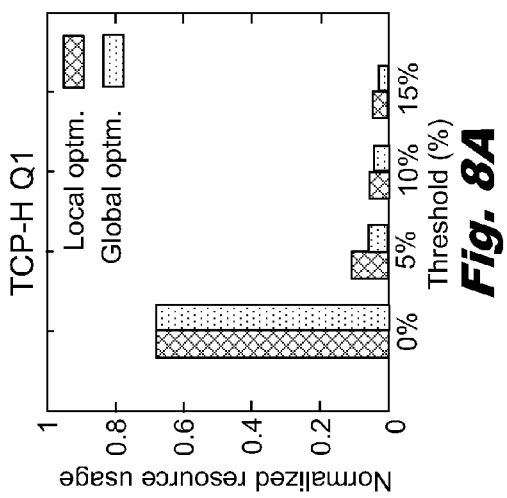
Fig. 8C TCP-H Q13
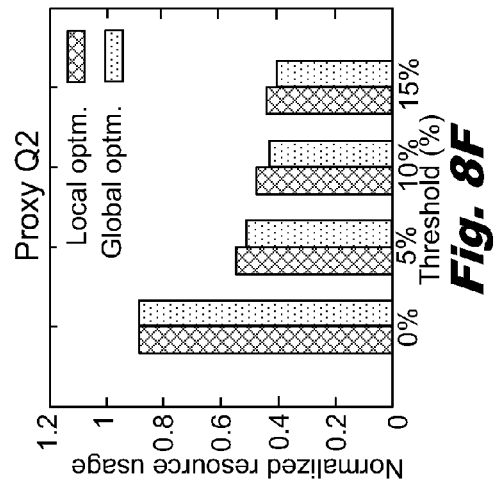
Fig. 8D TCP-H Q19
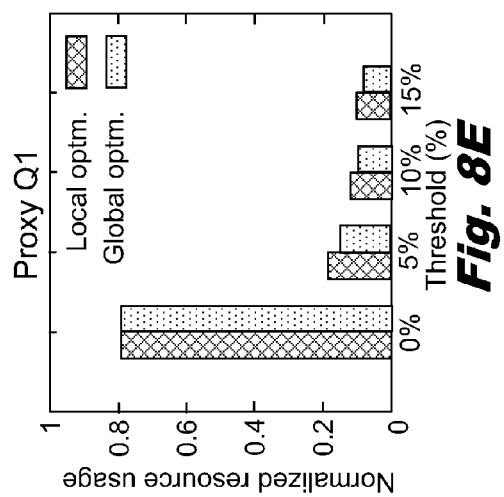
Fig. 8E Proxy Q1
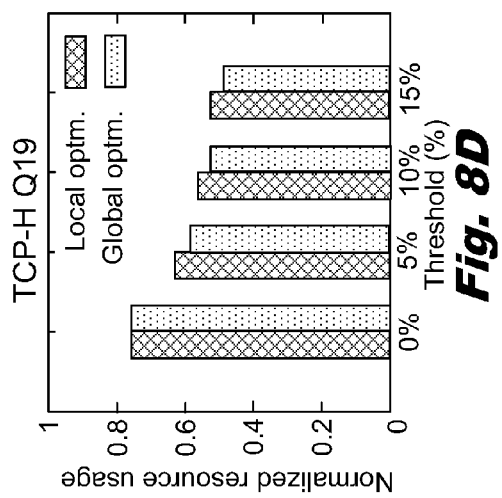
Fig. 8F Proxy Q2

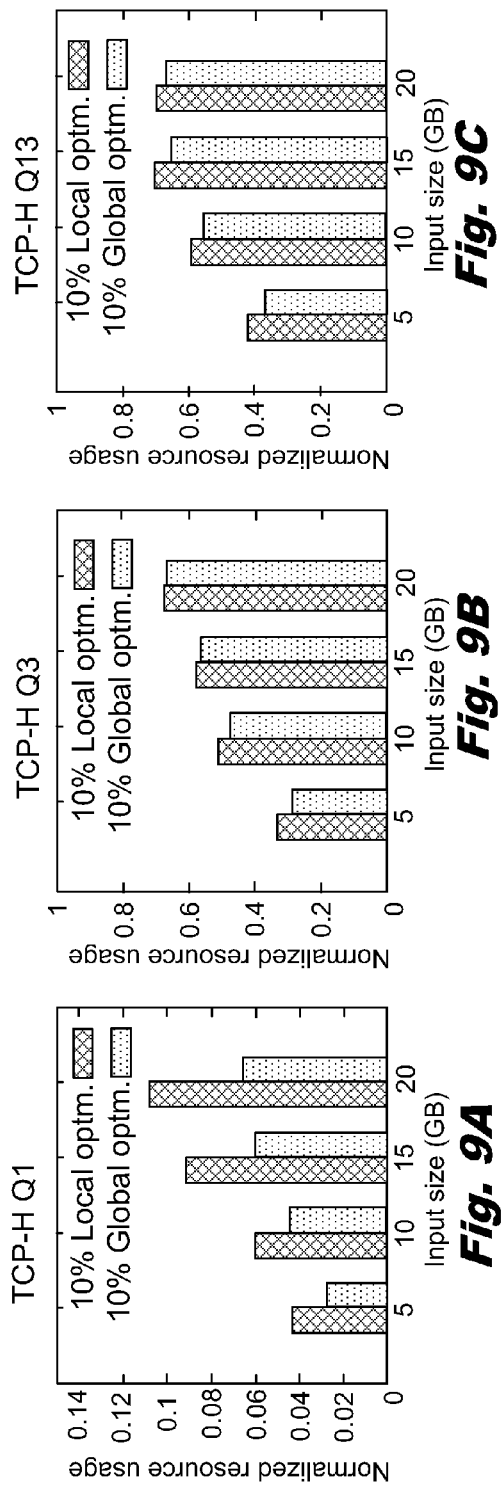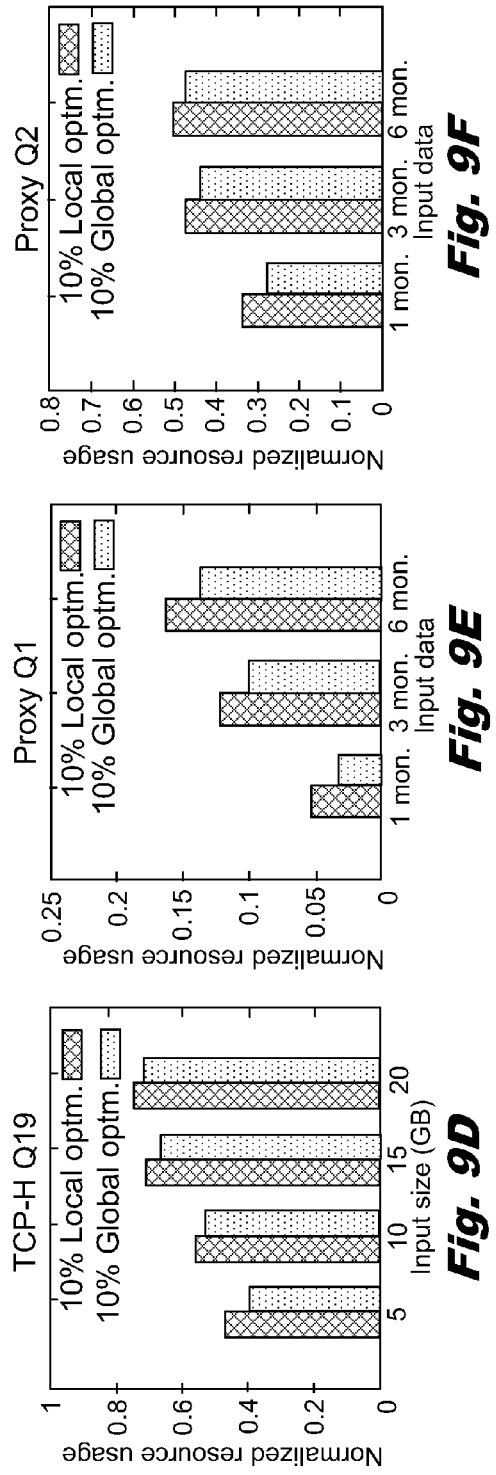
Fig. 9A  Fig. 9B  Fig. 9C  Fig. 9D  Fig. 9E  Fig. 9F

US 9,772,886 B2

OPTIMIZING EXECUTION AND RESOURCE USAGE IN LARGE SCALE COMPUTING

BACKGROUND

The amount of data in the world is exploding and meaningfully analyzing large data sets ("Big Data") has become an increasing challenge in computing. Data sets grow in size because of increasing data gathering by ubiquitous information-sensing devices, more capable sensors and sensor platforms, and increasing generation of data by human interaction. Computing and algorithm limitations associated with analyzing big data are felt in a wide range of areas including health care, meteorology, genomics, complex physics simulations, biological and environmental research, internet search, surveillance, photo/video archives, finance and business informatics, and other areas.

BRIEF DESCRIPTION OF THE DRAWINGS

The accompanying drawings illustrate various examples of the principles described herein and are a part of the specification. The illustrated examples are merely examples and do not limit the scope of the claims.

FIG. 6A is a chart of notation that is used for defining optimization strategies in MapReduce jobs, according to one example of principles described herein.

FIG. 6B is an algorithm listing for local optimization of a MapReduce workflow, according to one example of principles described herein.

FIG. 6C is an algorithm for global optimization of a MapReduce workflow, according to one example of principles described herein.

FIGS. 8A-8F are graphs of local and global optimization strategies that result in significant resource savings, according to one example of principles described herein.

FIGS. 9A-9F are graphs of local and global optimization strategies for resource usage where the queries process different amounts of input data, according to one example of principles described herein.

Throughout the drawings, identical reference numbers designate similar, but not necessarily identical, elements.

DETAILED DESCRIPTION

Figure 1A:
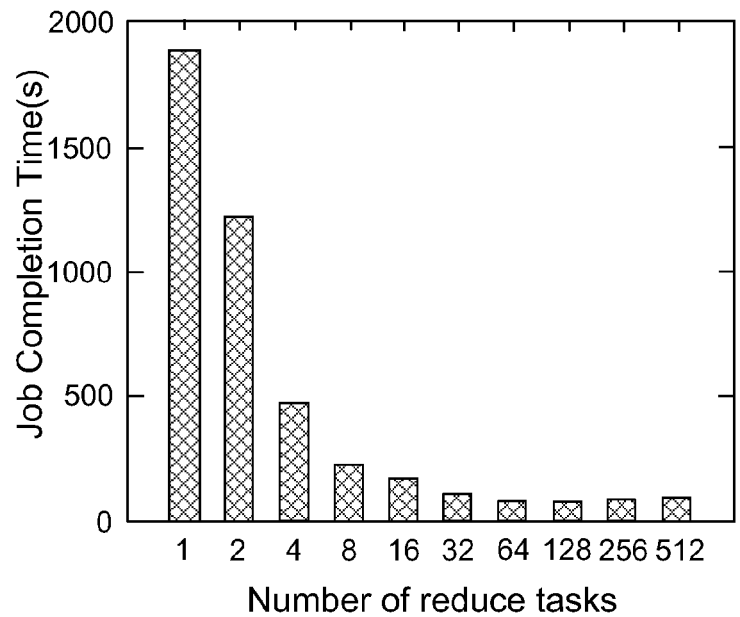
FIG. 1A is a graph showing completion time of a job as a function of the division of the job into tasks that are operated in parallel, according to one example of principles described herein.

A world of Big Data causes a paradigm shift towards large-scale data intensive computing. Enterprises and organizations are looking for new opportunities to extract competitive business value from the fast growing universe of structured and semi-structured data. Big Data analytics is increasingly performed using the MapReduce paradigm and with its open-source implementation Hadoop® as a platform choice.

MapReduce is a framework for processing parallelizable problems across large datasets using multiple computers. These computers are called "nodes" or "slots" and are collectively called a "cluster" if all the nodes are on the same local network and use similar hardware, or a "grid" if the nodes are shared across geographically and administratively distributed systems. The name "MapReduce" is a combination of the "map" and "reduce" functions used in functional programming. In the map step, a master node takes the input, divides it into smaller sub-problems and distributes these sub-problems to worker nodes. The worker nodes process the smaller problems and pass the answers back to master nodes. In the reduce step, the master nodes collect the answers to all the sub-problems and combines them in some way to form the output. This output is the answer to the problem the algorithm was originally trying to solve. By parallelizing the data processing operations, MapReduce can operate on very large datasets using commodity servers. For example, a large server farm can use MapReduce to sort a petabyte of data in only a few hours.

In many cases, an output from a MapReduce job is the input to the next MapReduce job. Multiple MapReduce jobs can be operated in series to arrive at a final answer or to continuously operate on an incoming data stream.

The original MapReduce framework, while being simple and elegant, imposes a rigid, low-level data processing schema. To ease the task of writing complex queries and data analysis programs, several projects, e.g., Pig and Hive, offer high-level Structured Query Language (SQL) like languages and processing systems on top of MapReduce engines. These frameworks enable expressing the complex analytics tasks with high-level declarative abstractions that are compiled into directed acyclic graphs (DAGs) and workflows of MapReduce jobs.

Optimizing the execution efficiency of these programs is an open challenge that is often solved manually. This problem is exacerbated by the increasing data growth rates, new sources of data, and changing data formats. There are a number of parameters that influence execution of a MapReduce operation. These parameters include: the amount of data to be processed, the amount of computing resources (processors, random access memory (RAM), network communication capacity, hard drive space, etc.), the allocation of tasks to all or a selection of the computing resources, the size of the task given to each worker node, and other parameters.

Currently, a user must specify the number of reduce tasks for each MapReduce job (the default setting is 1 reduce task). Each reduce task is assigned to one processing slot in a worker node. The number of reduce tasks directly correlates to the amount of parallel processing occurring within the cluster or grid. Determining the right number of reduce tasks is non-trivial: it depends on the input sizes of the job, on the Hadoop cluster size, and the amount of resources available for processing this job. In the MapReduce workflow, two sequential jobs are data dependent: the output of one job becomes the input of the next job, and therefore, the number of reduce tasks in the previous job defines the number (and size) of input files of the next job, and may affect its performance and processing efficiency in unexpected ways.

The selection of operating parameters is typically made by human operators based on rules of thumb. These rules of thumb are generalizations that may not be tuned to the specific task being performed. Examples of these rules of thumb include: "the total number of worker nodes should be approximately 90% of the total nodes available" and "aim for map tasks running for 1-3 minutes each." The rational for these rules of thumb is based on the experience of processing data sets. For example, if the tasks distributed to the worker nodes are too small, there is wasted startup overhead. If the tasks distributed to the worker nodes are too big, there is not enough parallelism to complete the task in a reasonable amount of time. These rules of thumb, while easy to apply, do not always produce optimum results or resource usage. Additionally, these rules of thumb do not provide insight about the actual operation of the MapReduce processes or inform trade offs between resource usage and execution time. The principles described below support parameter tuning and execution optimization of these programs.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

I. Motivation

Figure 1B:
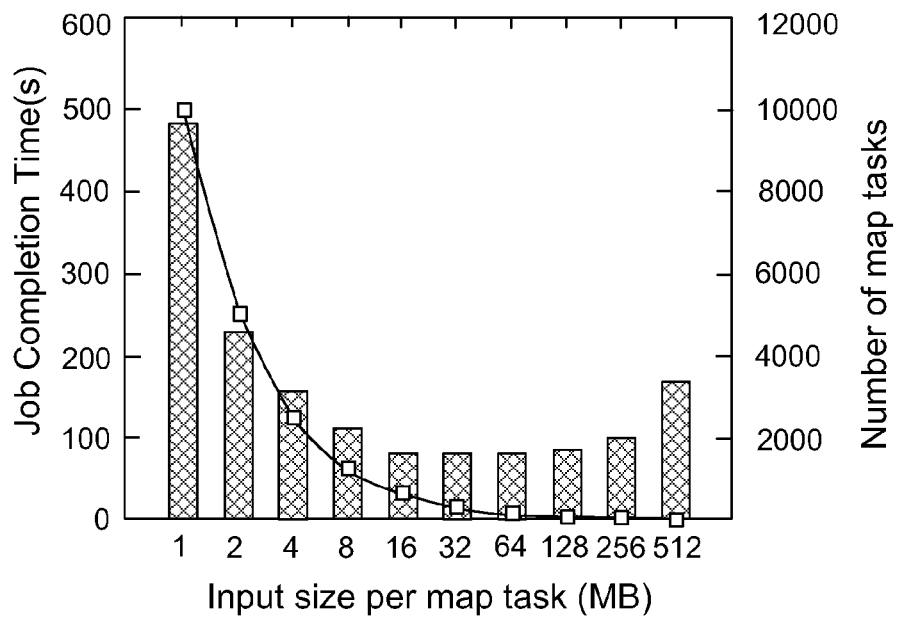
FIG. 1B is a graph showing completion time of a job as a function of the size of the input tasks, according to one example of principles described herein.

FIGS. 1A and 1B show a motivating example of the influence of the number of reduce tasks and the size of the reduce tasks on the completion time of a MapReduce job. In these experiments, the Sort benchmark with a 10 GB input is executed on a Hadoop cluster with 64 worker nodes, each configured with 2 map and 2 reduce slots, i.e., with 128 map and 128 reduce slots overall. FIG. 1A shows the job completion time with different numbers of reduce tasks used for executing the same job. Configurations with 64 and 128 reduce tasks produce much better results compared to other settings shown in this graph. Intuitively, settings with a low number of reduce tasks limit the job execution concurrency. Settings with a higher number of reduce tasks increase the job execution parallelism but they also require a higher amount of resources ("slots" or "nodes") assigned to the program. Moreover, at some point (e.g., 512 reduce tasks) additional parallelization leads to a higher overhead and higher processing time.

FIG. 1B shows a complementary situation: it reflects how the job completion time is impacted by the input data size per map task. In these experiments, the same Sort benchmark with a 10 GB input was used, which has a fixed number of 120 reduce tasks, but the input file sizes of the map tasks are different. The line that goes across the bars reflects the number of map tasks executed by the program (practically, it shows the concurrency degree in the map stage execution). Data points on the line are shown as open boxes. The interesting observation here is that a smaller size input per task incurs a higher processing overhead that overrides the benefits of a high execution parallelism for high numbers of input map tasks. Observing the job completion time as a function of input size is also important in a workflow setting because the outputs generated by the previous job become inputs of the next one, and the size of the generated files may have a significant impact of the performance of the next job.

Another interesting observation in FIG. 1B is that there are a few reduce task settings (e.g., 64 and 128) and a few input sizes per map task that result in a similar completion time, but differ in how many reduce and map slots are needed for job processing. Nearly optimal completion time can be achieved with a significantly smaller number of reduce and map tasks. In many instances it has been observed that the lack of reduce slots ("starvation") in the Hadoop cluster is a main cause of longer completion times. Therefore, optimizing the reduce task settings (decreasing the number of reduce tasks) while achieving performance objectives is a desirable feature of an efficient workload management in the cluster.

The principles taught below show a design for a performance evaluation framework, called AutoTune, that automates the user efforts of tuning the numbers of reduce tasks along the MapReduce workflow. AutoTune includes the following key components:

An ensemble of performance models that orchestrates the prediction of the workflow completion time at different system and applications levels. It combines i) a platform performance model that estimates a generic phase duration as a function of processed data at the Hadoop level, ii) a MapReduce job model that is used to predict the job execution time when the map and reduce tasks process different amount of data, and iii) a workflow performance model that combines all parts together for evaluating the completion time of the entire workflow as a function of reduce task settings.

Optimization strategies that are used for determining the numbers of reduce tasks along the jobs in the MapReduce workflow and for analyzing the performance trade-offs, i.e., for optimizing the workflow completion time while minimizing the resource usage for its execution. Two illustrative optimization strategies are provided: a local one that searches for trade-offs at a job level, and a global one that makes the optimization trade-off decisions at the workflow level.

The accuracy, efficiency, and performance benefits of the framework are evaluated using a set of realistic MapReduce applications executed on a 66-node Hadoop cluster. This set includes TPC-H queries and custom programs mining a collection of enterprise web proxy logs. The evaluations show that the optimized program settings depend on the size of the processed data and available cluster resources. Thus, even if the optimal settings are empirically derived—they might become inefficient for a different size input set or changed resource allocations to this program. Since the input datasets may vary significantly for periodic production jobs, it is beneficial to design an efficient tuning framework that can be used for frequent and fast evaluation. The principles describe an ensemble of models that effectively and accurately predicts workflow completion time. The experimental validation of this ensemble of models shows that in many cases, by allowing 5%-10% increase in the workflow completion time, there can be a savings of 40%-90% of resource usage. The ability to optimize the number of reduce slots used by the programs enables efficient workload management in the cluster.

The discussion below is organized as follows. Section II provides additional operational information with regard to MapReduce. Section III presents the problem definition and the principles that guide the solutions to the problem. Sections IV-V describe the microbenchmark suite, the ensemble of performance models, and optimization strategies. Section VI evaluates the framework accuracy and effectiveness of optimization strategies.

II. MapReduce Operation

MapReduce includes a map task and a reduce task, each with a number of operational execution phases. This section describes those phases and various techniques that can be used for phase profiling.

A. MapReduce Processing Phases

As discussed above, the main computation of the MapReduce model is expressed as two user-defined functions: map and reduce. The map function takes an input pair and produces a list of intermediate key/value pairs. The intermediate values associated with the same key $k_2$ are grouped together and then passed to the reduce function. The reduce function takes intermediate key $k_2$ with a list of values and processes them to form a new list of values.

$$\text{map}(k_1, v_1) \rightarrow \text{list}(k_2, v_2)$$

$$\text{reduce}(k_2, \text{list}(v_2)) \rightarrow \text{list}(v_3)$$

MapReduce jobs are executed across multiple machines: the map stage is partitioned into map tasks and the reduce stage is partitioned into reduce tasks. The execution of map tasks define the map stage, and the execution of reduce tasks define the reduce stage. The execution of each map (reduce) task is comprised of a specific, well-defined sequence of processing phases. Intuitively, only the executions of user-defined map and reduce functions are custom and depend on the user code across different MapReduce jobs. The executions of the remaining phases are generic across different MapReduce jobs and depend on the amount of data flowing through each phase and the performance of the underlying Hadoop cluster. There is a barrier between map and reduce stages, i.e., the reduce function in the reduce task can be executed only when all map tasks of the map stage are completed.

Figure 2:
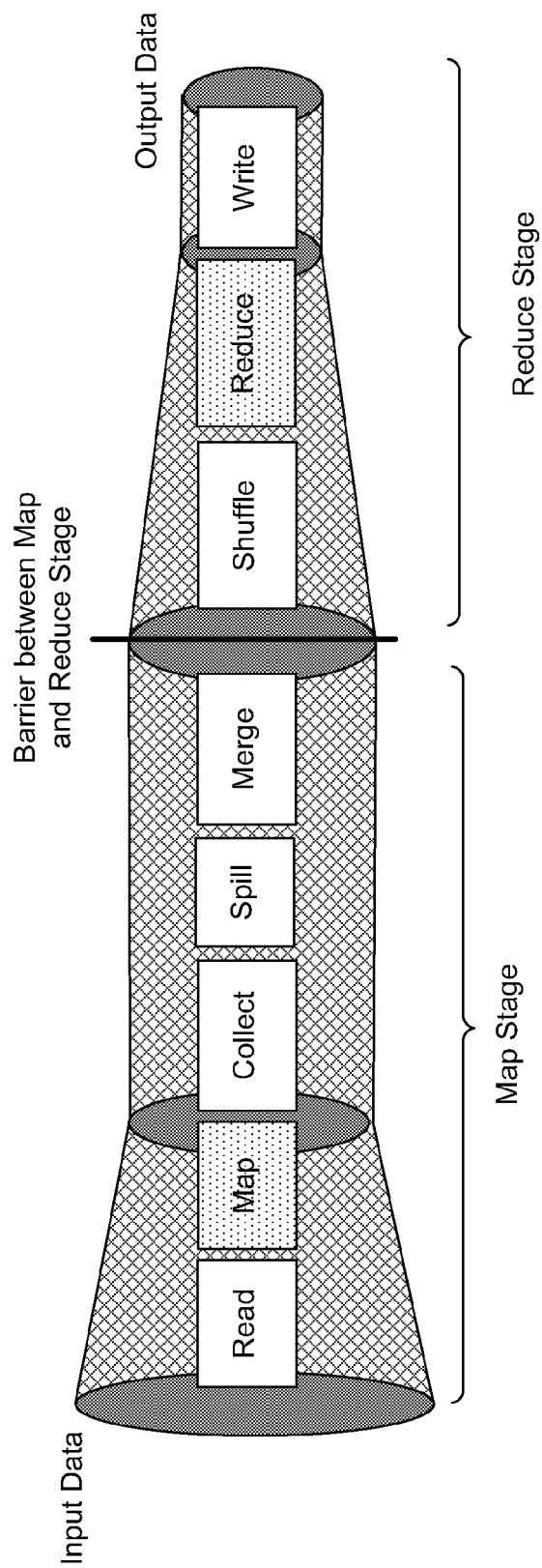
FIG. 2 is a diagram of various tasks and phases within a MapReduce job, according to one example of principles described herein.

FIG. 2 shows an example of a MapReduce processing pipeline. As shown in FIG. 2 there are five phases of the map task execution and three phases of the reduce task execution.

Map task processing is represented by the following phases:
1) Read—reading a data block (e.g., 64 MB) from the Hadoop distributed file system (HDFS).
2) Map—applying the user-defined map function to each record in the input file and generating the map-output data (intermediate data). The size of the map-output data may be different from the map-input size.
3) Collect—buffering the map phase outputs into memory.
4) Spill—sorting and partitioning the intermediate data across different reduce tasks; applying the combiner if available, and then writing the intermediate data to a local disk. If the combiner is applied then the size of the output data might be different compared to the phase input size.
5) Merge—merging different spill files into a single spill file for each reduce task.

Reduce task processing is represented by the following phases:

1) Shuffle—transferring the intermediate data from map tasks to reduce tasks and merge-sorting them together. Since the shuffle and sort phases are interleaved, in the Hadoop implementation they are combined into a single shuffle step.
2) Reduce—applying the user-defined reduce function on the input key and all the values corresponding to it to produce the final output data. The amount of output data may be different compared to the reduce phase input.
3) Write—writing the reduce output to HDFS.

Apart from the phases described above, each task has a constant overhead for setting and cleaning up. These overhead operations are accounted for separately for each task.

As shown in FIG. 2, the amount of data in the MapReduce processing pipeline can change during the execution of the MapReduce operation. The large oval on the left labeled "input data" represents a large amount of data that enters the process, while the intermediate ovals are smaller, indicating that a reduction in the amount of data has occurred. The output data is represented by the small oval on the right labeled "output data." Thus for this example, the amount of output data by the process is significantly less than the amount of input data.

B. Two Examples of Approaches to MapReduce Phase Profiling

Durations of executed map and reduce tasks and the amount of processed data (i.e., their inputs and outputs both in bytes and the number of processed records) can be obtained from the counters at the job master during the job execution or parsed from the logs. The duration of the shuffle phase can also be determined from the same sources. However, for obtaining the execution time of the remaining phases, a special profiling technique is implemented. There are two different approaches for implementing phase profiling.

1) The current Hadoop implementation already includes several counters such as the number of bytes read and written. These counters are sent by the worker nodes to the master node periodically with each heartbeat. This Hadoop code was modified by adding counters that measure the durations of eight phases to the existing counter reporting mechanism. A subset of these counters can be activated in the Hadoop configuration to collect the selected phase measurements. This approach incurs a small overhead but requires the creation and execution of modified Hadoop code.

2) An alternative profiling tool in Java was created to dynamically measure performance of the Hadoop cluster. This approach may be particularly appealing because it has a zero overhead when monitoring is turned off. Selected Java classes and functions internal to Hadoop were instrumented using BTrace to measure the time taken for executing different phases. BTrace is a non-intrusive, read-only Java tool that allows a user to define probes and monitors a running application without stopping or recompiling the source code that is instrumented. However, the dynamic instrumentation overhead is still significantly higher compared to adding the new Hadoop counters directly in the source code.

III. Problem Definition and Example Solutions

Currently, a user must specify the number of reduce tasks for each MapReduce job in a workflow (the default setting is 1 reduce task). Moreover, two sequential jobs are data dependent: the output of one job defines the input of the next job, and therefore, the number of reduce tasks in the previous job may affect the processing efficiency of the next one.

Figure 3:
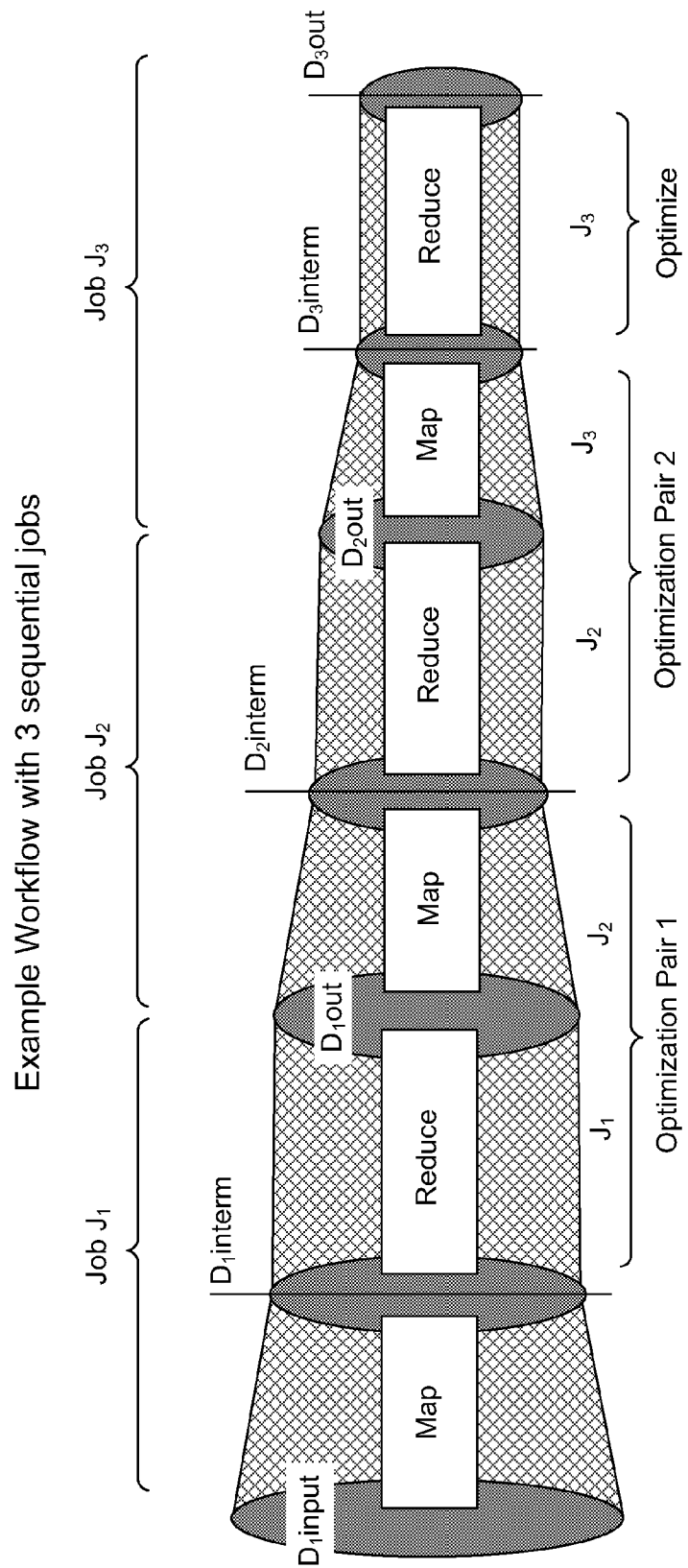
FIG. 3 is a diagram of a MapReduce workflow that includes a number of sequential jobs, according to one example of principles described herein.

The principles below describe a performance evaluation framework for tuning the numbers of reduce tasks along a MapReduce workflow to optimize its overall completion time while minimizing the resource usage for its execution. FIG. 3 shows one example workflow that includes three sequential jobs: $J_1$; $J_2$; and $J_3$. To optimize the workflow completion time, the reduce task settings (or other settings) in jobs $J_1$; $J_2$; and $J_3$ can be tuned. A question to answer is whether the choice of the reduce task setting in job $J_1$ impacts the choice of the reduce task setting in job $J_2$, etc. An interesting observation here is that the size of the overall data generated between the map and reduce stages of the same job and between two sequential jobs does not depend on the reduce task settings of these jobs. For example, the overall amount of output data $D_1^{out}$ of job $J_1$ does not depend on the number of reduce tasks in $J_1$. It is defined by the size and properties of $D_1^{interm}$, and the semantics of $J_1$'s reduce function. Similarly, the amount of $D_2^{interm}$ is defined by the size of $D_1^{out}$, properties of this data, and the semantics of $J_2$'s map function. Again, the size of $D_2^{interm}$ does not depend on the number of reduce tasks in $J_1$.

Therefore the amount of intermediate data generated by the map stage of $J_2$ is the same (i.e., invariant) for different settings of reduce tasks in the previous job $J_1$. It means that the choice of an appropriate number of reduce tasks in job $J_2$ does not depend on the choice of the reduce task setting of job $J_1$. It is primarily driven by an optimized execution of the next pair of jobs $J_2$ and $J_3$. Finally, tuning the reduce task setting in $J_3$ is driven by optimizing its own completion time.

In such a way, the optimization problem of the entire workflow can be efficiently solved through the optimization problem of the pairs (e.g. pair 1 and pair 2 in FIG. 3) of its sequential jobs. Therefore, for two sequential jobs $J_1$ and $J_2$, a model was generated that evaluates the execution times of $J_1$'s reduce stage and $J_2$'s map stage as a function of a number of reduce tasks in $J_1$. Such a model enables iteration through a range of reduce tasks' parameters and identification of a parameter(s) that leads to the minimized completion time of these jobs.

Determining the completion time for a MapReduce job can be challenging. The main challenge is to estimate the durations of map and reduce tasks (and the entire job) when these tasks process different amount of data (compared to past job runs). Some approaches for predicting the job completion time include analyzing map and reduce task durations from the past job runs, and then deriving some scaling factors for task execution times when the original MapReduce application is applied for processing a larger dataset. Other approaches include performing a more detailed (and more expensive) job profiling and time prediction at a level of phases that comprise the execution of map and reduce tasks.

The principles below describe a new approach for designing a MapReduce performance model. This approach combines the useful rationale of the detailed phase profiling method for estimating durations of map/reduce tasks with fast and practical analytical models. The profiling method is applied to the generic (non-customized) phases of the MapReduce processing pipeline (as opposed to phase profiling of specific MapReduce jobs). In FIG. 2, the generic phases are unshaded and the custom phases (user defined) are shaded. By running a set of diverse benchmarks on a given Hadoop cluster, a useful training set is collected that characterizes the execution time of different phases while processing different amounts of data. This profiling can be done in a small test cluster with the same hardware and configuration as the production cluster. For these experiments, the Hadoop counter-based profiling approach was used due to its simplicity and low overhead. The modified Hadoop version that implements the counters was deployed in the test environment. The platform performance model was derived from the training set using a robust linear regression. The platform performance model estimates each phase duration as a function of processed data.

For profiling map and reduce phases (user-defined map and reduce functions) of production MapReduce jobs, the alternative profiling tool based on the BTrace approach was used. It can be applied to jobs in the production cluster. The monitoring overhead was small since the alternative profiling tool is only used to profile map and reduce phase execution. Once the execution times of map and reduce tasks are approximated, the completion time of a single job can then be modeled by applying an analytical model. The proposed performance model utilizes the knowledge about average and maximum of map/reduce task durations for computing the lower and upper bounds on the job completion time as a function of allocated map and reduce slots. Equation 1 shows the lower-bound on the job completion time.

$$T_J^{low} = \frac{N_M^J \Box M_{avg}^J}{S_M^J} + \frac{N_R^J \Box R_{avg}^J}{S_R^J} \qquad \text{Eq. 1}$$

where $M_{avg}^J$ ($R_{avg}^J$) represent the average map (reduce) task duration, $N_M^J$ ($N_R^J$) denote the map (reduce) task number and $S_M^J$ ($S_R^J$) reflect the number of map (reduce) slots for processing the job. The computation of the upper bound on the job completion time is slightly different. The average of lower and upper bounds serves as a good prediction of the job completion time (it is within 10% of the measured completion time).

IV. Microbenchmarks and Performance Models

In this section, principles relating to using benchmarking to derive a Hadoop platform model are discussed. MapReduce models for predicting the job completion time as a function of processed data and assigned resources are then discussed. Finally, a workflow performance model that combines all the models together is presented.

A. Microbenchmarks

A set of parameterizable microbenchmarks to characterize execution times of different phases for processing different amounts of data on a given Hadoop cluster are described below. These microbenchmarks can be generated by varying the following parameters:

1) Input size per map task ($M^{inp}$): This parameter controls the input read by each map task. Therefore, it helps to profile the Read phase durations for processing different amounts of data.
2) Map selectivity ($M^{sel}$): this parameter defines the ratio of the map output to the map input. It controls the amount of data produced as the output of the map function, and therefore directly affects the Collect, Spill and Merge phase durations, as well as the amount of data processed by the Shuffle and Reduce phases.
3) A number of map tasks $N^{map}$: This parameter helps to expedite generating the large amount of intermediate data per reduce task.

4) A number of reduce tasks $N^{red}$: This parameter helps to control the number of reduce tasks to expedite the training set generation with the large amount of intermediate data per reduce task.

Thus, each microbenchmark $MB_i$ is parameterized as $$MB_i = (M_i^{inp}, M_i^{sel}, N_i^{map}, N_i^{red})$$

Each created benchmark uses input data consisting of 100 byte key/value pairs generated with TeraGen, which is a Hadoop utility for generating synthetic data. The map function simply emits the input records according to the specified map selectivity for this benchmark. The reduce function is defined as the identity function. Most of the benchmarks consist of a specified (fixed) number of map and reduce tasks. For example, benchmarks may be generated with 40 map and 40 reduce tasks, each for execution in small cluster deployments with 5 worker nodes. Various benchmarks were run with the following parameters: $M^{inp}=\{2\ MB, 4\ MB, 8\ MB, 16\ MB, 32\ MB, 64\ MB\}$; $M^{sel}=\{0.2, 0.6, 1.0, 1.4, 1.8\}$. For each value of $M^{inp}$ and $M^{sel}$, a new benchmark is executed. Benchmarks were also generated for special ranges of intermediate data per reduce task for accurate characterization of the shuffle phase. These benchmarks are defined by $N^{map}=\{20, 30, \ldots, 150, 160\}$; $M^{inp}=64\ MB$, $M^{sel}=5:0$ and $N^{red}=5$ which result in different intermediate data size per reduce tasks ranging from 1 GB to 12 GB. Note that a user may extend and customize any of described parameter ranges.

B. Platform Profile and Platform Performance Model of a Given Hadoop Cluster

The platform profile is generated by running a set of microbenchmarks on the small 5-node cluster deployment that is similar to a given production Hadoop cluster. While executing each microbenchmark, the duration and the amount of processed data per generic phase for all executed map and reduce tasks was gathered. A set of these measurements defines the platform profile. The following notation is used: each phase is denoted by its duration and the amount of processed data as $T_{phase}$ and $Data_{phase}$ respectively, where phase={read, collect, spill, merge, shuffle, write}.

Figures 4, 5:
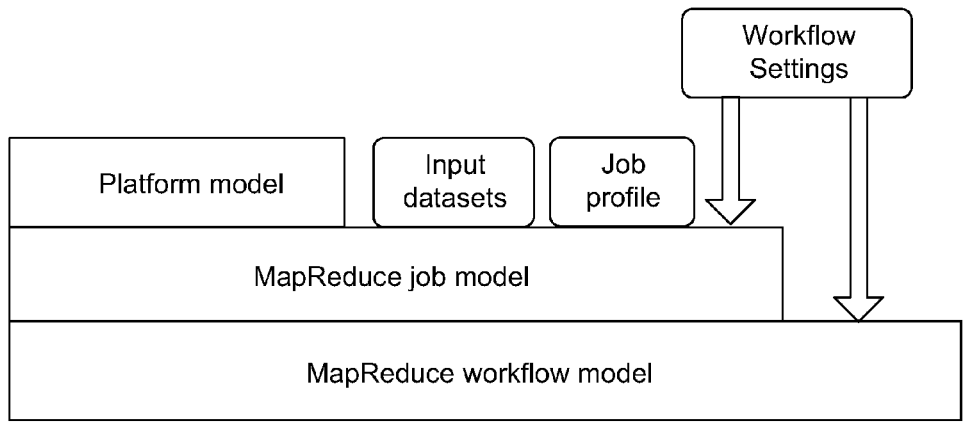
FIG. 4 is a portion of a platform profile for read and collect phases in a MapReduce job, according to one example of principles described herein.
FIG. 5 is an example of an ensemble of performance models evaluated by workflow completion time, according to one example of principles described herein.

FIG. 4 shows a small fragment of a collected platform profile as a result of executing the microbenchmarking set. There are six tables in the platform profile, one for each generic phase. FIG. 4 shows fragments for read and collect phases. Because microbenchmarkers have multiple map/reduce tasks that process the same amount of data, there are multiple measurements in the profile with the same data amount.

Principles related to the creation of a platform performance model $M_{platform}$, which characterizes the phase execution time as a function of processed data on the Hadoop cluster will now be described. To create the platform performance model, relationships between the amount of processed data and durations of different execution phases are determined using the set of collected measurements. Six submodels ($M_{phase}$) are built, where phase ∈ {read, collect, spill, merge, shuffle, write} for a given Hadoop cluster. Using measurements from the collected platform profile, a set of equations which express a phase duration as a linear function of processed data are generated.

Let $Data^j_{phase}$ be the amount of processed data in the row j of platform profile with K rows. Let $T^j_{phase}$ be the duration of the corresponding phase in the same row j. Then, using linear regression, the following sets of equations can be solved:

$$A_{phase} + B_{phase} \cdot D_{phase}^j = T_{phase}^j \qquad \text{Eq. 2}$$

where j=1; 2; . . . , K. To solve for $(A_{phase}, B_{phase})$, one can choose a regression method from a variety of methods such as a non-negative Least Squares Regression.

Let $(\hat{A}_{phase}, \hat{B}_{phase})$ denote a solution for the equation set (2). The sub-model that defines the duration of execution phase is then given as a function of the processed data. The platform performance model is:

$$M_{platform} = (M_{read}, M_{collect}, M_{spill}, M_{merge}, M_{shuffle}, M_{write}).$$

An additional test can be used to verify whether a piecewise linear function may provide a better approximation for different segments of training data (ordered by the increasing data amount) instead of a single one (e.g., due to in-memory vs. disk processing for specific data ranges). This is further discussed in Section VI.

C. MapReduce Job and Workflow Performance Models

For two sequential jobs $J_i$ and $J_{i+1}$ in a workflow W the execution of $J_{i+1}$ only starts when job $J_i$ is completed. Thus, the overall completion time of two sequential jobs is approximated as a sum of their individual completion times $T_{J_i}$ and $T_{J_{i+1}}$. Therefore, given a workflow that consists of n sequential jobs, i.e., $W=\{J_1, \ldots, J_n\}$, its completion time is estimated as follows:

$$T_W = \sum_{1 \leq i \leq n} T_{J_i} \qquad \text{Eq. 3}$$

For modeling the completion time of a single job, an analytical model is designed, used, and validated. This analytical model provides accurate results if it is supplied with accurate measurements (average and maximum) of map/reduce task execution times. The change of reduce task settings in workflow jobs leads to the increased (decreased) amount of processed data per map/reduce task. As discussed in Section III, one of the modeling challenges is the ability to accurately estimate the durations of map and reduce tasks when they process different amounts of data. The execution times of map and reduce tasks of job J are estimated as a sum of the phase durations:

$$T_{M\_task}^J = T_{read}^J + T_{map}^J + T_{collect}^J + T_{spill}^J + T_{merge}^J \qquad \text{Eq. 4}$$

$$T_{R\_task}^J = T_{shuffle}^J + T_{reduce}^J + T_{write}^J \qquad \text{Eq. 5}$$

The durations of generic phases are approximated with the platform performance model by applying the derived functions to the amount of data flowing through the phases:

$$T_{phase}^J = M_{phase}(Data_{phase}^J) \qquad \text{Eq. 6}$$

where phase ∈ {read,collect,spill,merge,shuffle,write}.

In order to estimate the amount of data flowing through generic phases of a given MapReduce job J, a special compact job profile is extracted automatically from the previous run of this job. It includes the following metrics:

$Sel_M^J(Sel_R^J)$—the map (reduce) selectivity that reflects the ratio of the map (reduce) output size to the map (reduce) input size;

$T_{Rec\_map}^J(T_{Rec\_red}^J)$—the processing time per record of the map (reduce) function.

FIG. 5 outlines the ensemble of performance models designed for evaluating the workflow completion time. Using the extracted job profiles, the information on the jobs' input datasets, and workflow settings (which define the number of reduce tasks in each job), an estimate can be made of the amount of data processed by jobs in a workflow. Moreover, estimates can be made of the average and maximum data amounts processed by map/reduce tasks (and all their phases) of each job in the workflow. Then by applying the platform model, an approximation of the average and maximum durations of map/reduce tasks of each job can be determined. Once the durations of map and reduce tasks are accurately estimated, then the MapReduce performance model can be applied for predicting the completion time of each job. As a result, the overall workflow completion time can be estimated as a function of reduce task settings.

The estimate of data flowing through the jobs in a workflow can be done in a variety of ways. In one example, the input datasets of jobs in a workflow are divided between external and internal datasets. The external datasets reside in HDFS and exist prior to a workflow execution. The first job in a workflow has only external input datasets. The input dataset of a sequential job is defined by the output of its previous job, and this dataset is called an internal dataset.

Given a workflow, the automated process collects the average and maximum data block size (in bytes and in the number of records) for all the external input datasets in the workflow. Later, the process derives similar information for the internal datasets. This information determines the average and maximum input sizes per map task of a job J in the workflow, denoted as $\text{Inp}_M^{J,avg}$ and $\text{Inp}_M^{J,max}$ respectively. Note that the amount of data flowing through the collect, spill, and merge phases is estimated by applying the map selectivity $\text{Sel}_M^J$ to the input data size (in bytes and in records). If a combiner is defined for data aggregation and reduction during the spill phase, the process may include an additional combiner selectivity $\text{Sel}_{M\_comb}^J$, which is measured with special Hadoop counters. Using the average and maximum input data sizes $\text{Inp}_M^{J,avg}$ and $\text{Inp}_M^{J,max}$, the process determines the number of map tasks $N_M^J$ of each job J and estimates the average and maximum map task durations respectively.

The input size for the shuffle phase (i.e., the reduce input size) depends on the map outputs and the number of reduce tasks. Note that the number of reduce tasks $N_R^J$ is defined by the job configuration. Assume that the map outputs are distributed evenly across the reduce tasks. Then the reduce input size is computed in the following way:

$$\text{Data}_{shuffle}^J = (\text{Inp}_M^{J,avg} \times \text{Sel}_M^J \times N_M^J)/N_R^J \quad \text{Eq. 7}$$

The input size of the write phase is estimated by applying the reduce selectivity to the reduce input size as follows:

$$\text{Data}_{write}^J = \text{Data}_{shuffle}^J \times \text{Sel}_R^J \quad \text{Eq. 8}$$

The map and reduce phase durations depend on the user-defined functions and are evaluated from the number of input records $\text{Record}_{map}^J$ and $\text{Record}_{red}^J$ and the processing time per record of the map and reduce functions:

$$T_{map}^J = T_{Rec\_map}^J \times \text{Record}_{map}^J \quad \text{Eq. 9}$$

$$T_{reduce}^J = T_{Rec\_red}^J \times \text{Record}_{red}^J \quad \text{Eq. 10}$$

For an intermediate job $J_i$ in a given workflow, the input data size per map task depends on the following factors:
the number of reduce tasks $N_R^{J_{i-1}}$ and the output size of the previous job $J_{i-1}$; and
the block size $\text{Data}_{block}$ of HDFS.

Each reduce task generates an output file which is stored in HDFS. If the output file size is larger than the HDFS block size (default value 64 MB), the output file will be split into multiple data blocks, and each of them will be read by a map task of the next job. For example, let the output size be 70 MB. In this case, this output will be written as two blocks: one of 64 MB and the second of 6 MB, and it will define two map tasks that read files of varying sizes (64 MB and 6 MB).

Based on these observations, the process can estimate the number of map tasks and the average map input size of the next jobs as:

$$N_M^{J_i} = [\text{Data}_{write}^{J_{i-1}}/\text{Data}_{block}] \times N_R^{J_{i-1}} \quad \text{Eq. 11}$$

$$\text{Inp}_M^{J_i} = (\text{Data}_{write}^{J_{i-1}} \times N_R^{J_{i-1}})/N_M^{J_i} \quad \text{Eq. 12}$$

For jobs that read from multiple datasets, (e.g, jobs that perform the join operation), the process obtains the job profiles and the input data information for each dataset and estimates the average and maximum map task durations based on this information. Thus, for a job J with K different input datasets:

$$T_{M\_task}^{J,avg} = \frac{\sum_{1 \leq i \leq K} T_{M_i}^{J,avg} \times N_{M_i}^J}{\sum_{1 \leq i \leq K} N_{M_i}^J} \quad \text{Eq. 13}$$

$$T_{M\_task}^{J,max} = \max_{1 \leq i \leq K} T_{M_i}^{J,max} \quad \text{Eq. 14}$$

In summary, each performance model in the ensemble plays an important and complementary role. The reduce task settings change the amount of data processed by map and reduce tasks in a workflow. Therefore, the workflow performance model is used to compute the amount of data flowing through the jobs (and their phases) in a given workflow. Then, in order to accurately estimate durations of map and reduce tasks processing different amounts of data, the derived Hadoop platform performance model is applied. Note that the Hadoop platform model is created once, and then it is reused for predicting the map and reduce task durations of different jobs. Finally, the completion time of each job is evaluated using the MapReduce job performance model. The map reduce performance model allows computing the execution time estimates of the entire workflow.

Section III shows that the optimization problem of reduce task settings for a given workflow $W = \{J_1, \ldots, J_n\}$ can be efficiently solved through the optimization problem of the pairs of its sequential jobs. Therefore, for any two sequential jobs $(J_i, J_{i+1})$, where $i = 1, \ldots, n-1$, the execution times of $J_i$'s reduce stage and $J_{i+1}$'s map stage can be evaluated as a function of a number of reduce tasks $N_R^{J_i}$ in $J_i$ (see the related illustration in FIG. 3, Section III). This time can be denoted as $T_{i,i+1}(N_R^{J_i})$.

By iterating through the number of reduce tasks in $J_i$ the reduce task setting $N_R^{J_i,min}$ can be found that results in the minimal completion time $T_{i,i+1}^{min}$ for the pair $(J_i, J_{i+1})$, i.e., $T_{i,i+1}^{min} = T_{i,i+1}(N_R^{J_i,min})$. By determining the reduce task settings s for all the job pairs, i.e., $s^{min} = \{N_R^{J_1,min}, \ldots, N_R^{J_n,min}\}$ the minimal workflow completion time $T_W(s^{min})$ can be determined. Note that this approach for finding the reduce task setting that minimizes the workflow completion time can be applied to a different amount of available resources, e.g., the entire cluster, or 90% of available cluster resources, etc. In such a way, the optimized workflow execution can be constructed for any size resource pool managed (available) in a Hadoop cluster. The optimization strategy enables a user to analyze the possible trade-offs, such as workflow performance versus its resource usage. One such trade-off is: if the performance goal allows a specified increase of the minimal workflow completion time $T_W(s^{min})$, e.g., by 10%, then what is the resource usage under this workflow execution compared to $R_W(s^{min})$? The resource usage $R_{i,i+1}=(N_R^{J_i})$ for a sequential job pair $(J_i+J_{i+1})$ executed with the number of reduce tasks $N_R^{J_i}$ in job $J_i$ is defined as follows:

$$R_{i,i+1}(N_R^{J_i}) = T_{R\_task}^{J_i} \times N_R^{J_i} + T_{M\_task}^{J_{i+1}} \times N_M^{J_{i+1}}$$

where $N_M^{J_{i+1}}$ represents the number of map tasks of job $J_{i+1}$, and $T_{R\_task}^{J_i}$ and $T_{M\_task}^{J_{i+1}}$ represent the average execution time of reduce and map tasks of $J_i$ and $J_{i+1}$, respectively. The resource usage for the entire MapReduce workflow is defined as the sum of resource usage for each job within the workflow.

FIG. 6A is a chart summarizing notation that is used for defining optimization strategies in MapReduce jobs. FIG. 6B shows the first algorithm (Algorithm 1), which is based on the local optimization. The user specifies the allowed increase w_increase of the minimal workflow completion time $T_W(s^{min})$. The goal is to compute the new workflow reduce task settings that allow achieving this increased completion time. To accomplish this goal, a straightforward approach is to apply the user-defined w_increase to the minimal completion time $T_{i,i-1}^{min}$ of each pair of sequential jobs $(J_i+J_{i+1})$, and then determine the corresponding number of reduce tasks in $J_i$. The pseudo-code defining this strategy is shown in FIG. 6B. The completion time of each job pair is locally increased (line 2), and then the corresponding reduce task settings are computed (lines 4-6).

While this local optimization strategy can be straightforward to implement, there could be additional resource savings achieved if global optimization is considered. The resource usage for job pairs along the workflow might be quite different depending on the job characteristics. Therefore, identifying the job pairs with the highest resource savings (gains) for their increased completion times would allow for a more efficient operation. The pseudo-code defining this global optimization strategy is shown in Algorithm 2 shown in FIG. 6C. In Algorithm 2, the user-specified w_increase is first applied to determine the targeted completion time $T_{w\_incr}$ (line 2). The initial number of reduce task for each job $J_i$ is set to $N_R^{J_i,min}$ (lines 3-5), and then the iterations are performed in which each round estimates the gain (benefit) that can be obtained by decreasing the number of reduce tasks by one for each job $J_i$. The algorithm identifies the job that has the smallest response time increase with the decreased amount of reduce tasks while satisfying the targeted workflow completion time (lines 8-17). The job which brings the largest gain is picked and its reduce task setting is decreased by 1. Then the iteration repeats until the number of reduce tasks in any job cannot be further decreased because it would cause a violation of the targeted workflow completion time $T_{w\_incr}$ (line 11).

A. Experimental Testbed and Workloads

All experiments are performed on 66 HP DL145 G3 machines. Each machine has four AMD 2.39 GHz cores, 8 GB RAM and two 160 GB 7.2K rpm SATA hard disks. The machines are set up in two racks and are interconnected with gigabit Ethernet. Hadoop 0.20.2 and Pig-0.7.0 were used, with two machines dedicated as the JobTracker and NameNode, and remaining 64 machines as workers. Each worker is configured with 2 map and 2 reduce slots. The file system block size is set to 64 MB. The replication level is set to 3. Speculative execution was disabled since it did not lead to significant improvements in the experiments. To validate the accuracy, effectiveness, and performance benefits of the proposed framework, a workload set was used that includes queries from TPC-H benchmark and custom queries mining a collection of enterprise web proxy logs. TPC-H is a standard database benchmark for decision support workloads. It comes with a data generator that is used to generate the test database for queries included in the TPC-H suite. There are eight tables such as customer, supplier, orders, line item, part, partsupp, nation, and region used by queries in TPC-H. The input dataset size is controlled by the scaling factor (a parameter in the data generator). The scaling factor of 1 generates 1 GB input dataset. The enterprise proxy logs contain 6 months access logs of the enterprise web proxy during 2011-2012 years. The fields include information such as date, time, time-taken, c-ip, cs-host, etc. The specific queries are described below. TPC-H and proxy queries were implemented using Pig—a high-level SQL-like abstraction on top of Hadoop.

TPC-H Q1: This query provides a summary report of all the lineitems shipped as of a given date. The lineitems are grouped by different attributes and listed in ascending order. The query is translated into a workflow with two sequential MapReduce jobs, where the first job generates the aggregate lineitem information and then the second job sorts the generated results.

TPC-H Q19: This query reports gross discounted revenue for all orders for three different types of parts that were shipped by air or delivered in person. The query is translated into a workflow with two sequential MapReduce jobs: the first job joins tables order and lineitem and the second job aggregates the revenue on the joined data.

TPC-Q3: This query retrieves the shipping priority and potential revenue of the orders that have not been shipped and lists them in decreasing order of revenue. The query 7 is translated into four jobs with the first two jobs joining the orders, lineitems, and customer tables; the third job generating the aggregate revenue information for each order, and the last job sorting the results according to the revenue.

TPC-Q13: This query determines the distribution of customers by the number of orders they have made. (It counts and reports how many customers have no orders, how many have 1, 2, 3, etc.) The query is translated into four jobs with the first job joining the customer and orders tables, the next two jobs generating the customer count for each order amount, and the last job sorting the results accordingly to the order amount.

proxy-Q1: This program compares the average daily access frequency for each website during years 2011 and 2012 respectively. The program is translated into four jobs, where the first job computes the daily access frequency for each website during 2011, the second job joins this data with the data from 2012, the next two jobs aggregate and compare the average daily access frequency for each website from both years.

proxy-Q2: This program computes the intersection between the top 500 popular websites accessed by the enterprise users and the top 100 popular web-sites in US. The program is translated into three jobs, where the first job computes the access frequency for each website in the log data, the second job sorts these websites according to the access frequency and gets the 500 most popular ones, and the last job joins these computed websites with an external file that contains the top 100 popular web-sites in the US.

Figure 7A:
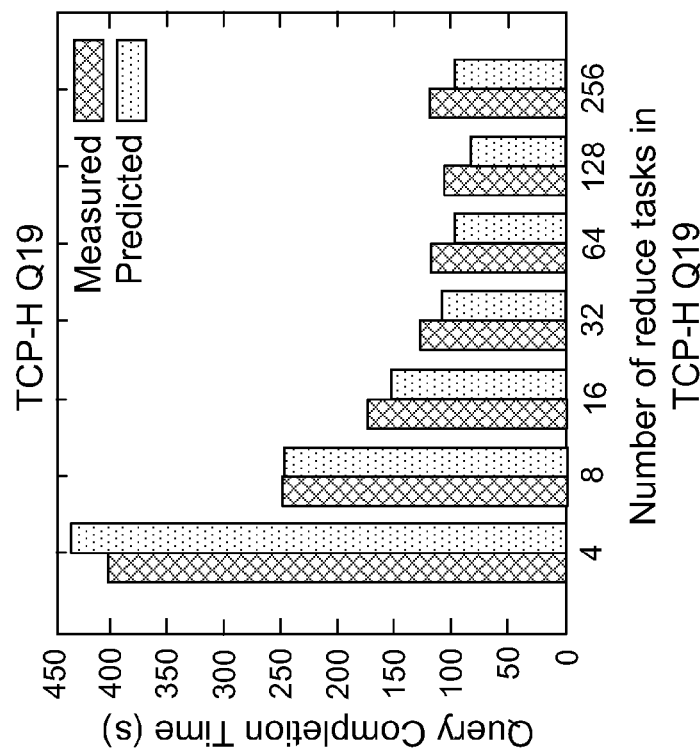
FIGS. 7A and 7B are graphs of measured and predicted query completion times for a range of reduce tasks, according to one example of principles described herein.
Figure 7B:
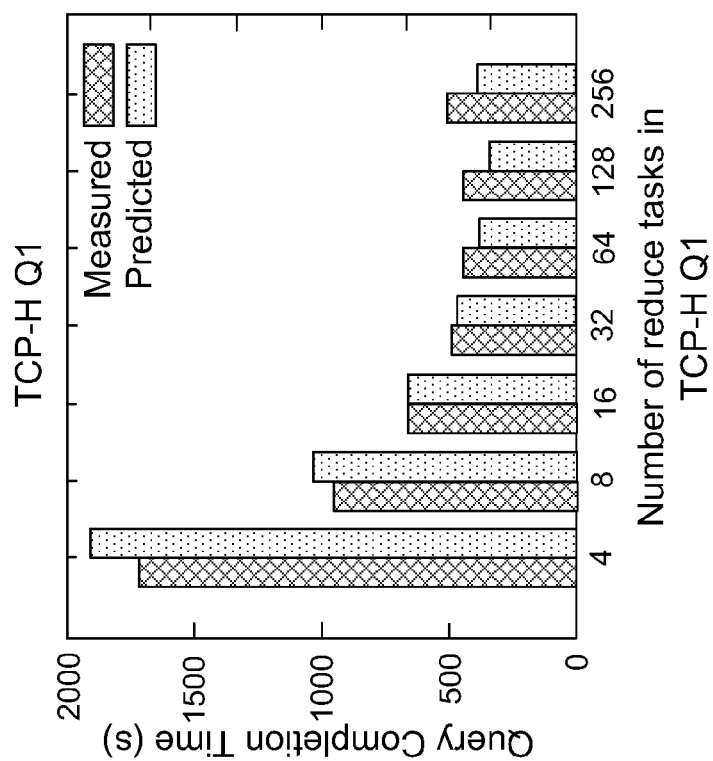

The accuracy of the constructed platform performance model and its underlying MapReduce job performance model are validated using TPC-H Q1 and TPC-H Q19 from the TPC-H benchmark. These two queries were executed on the 66 node Hadoop cluster with a total input size of 10 GB (a scaling factor of 10 using the TPC-H data generator). The results are shown in the charts of FIGS. 7A and 7B. FIG. 7A shows the completion time for the query TCP-H Q1 as a function of the number of reduce tasks the query is broken up into. The number of reduce tasks is shown along the horizontal axis. The query completion time in seconds is shown along the vertical axis. FIG. 7B shows the results for the query TCP-H Q19. First of all, results presented in FIGS. 7A and 7B show that the model(s) produces good quality predictions. The difference between measured and predicted completion times for most of the experiments is less than 10%. Moreover, the predicted completion times accurately reflect a similar trend observed in measured completion times of the studied workflows as a function of the reduce task configuration. These experiments demonstrate that there is a significant difference (up to 4-5 times) in the workflow completion times depending on the reduce task settings.

FIGS. 8A-8F show the normalized resource usage under local and global optimization strategies when they are applied with different thresholds for a workflow completion time increase, i.e., w-increase=0%, 5%, 10%, 15%. FIGS. 8A-8D show results for four TPC-H queries with the input size of 10 GB (i.e., scaling factor of 10), and FIGS. 8E-8F show results for two proxy queries that process 3-month data of web proxy logs. For presentation purposes, the normalized workflow resource usage is shown with respect to the resource usage under the rule of thumb setting that sets the number of reduce tasks in the job to 90% of the available reduce slots in the cluster. In the presented results, the resource usage of the map stage in the first job of the workflow is eliminated because its execution does not depend on the reduce task settings.

In each of the graphs, the increase in allowable execution time is plotted on the horizontal axis and the vertical axis shows the normalized resource usage required to fulfill a specified execution time. For each threshold percentage, the results of the local optimization model are shown on the left (as a crosshatched column) and the results of the global optimization model are shown on the right (as a shaded column).

The first group of bars in each of the graphs charts the normalized resource usage when a user aims to achieve the minimal workflow completion time (w_increase=0%). Even in this case, there are 5%-30% resource savings compared to the rule of thumb settings. When w_increase=0% the local and global optimization strategies are identical and produce the same results. However, if a user accepts an increase of 5% of the completion time, it leads to very significant resource savings: 40%-95% across different queries shown in FIGS. 8A-8E. The biggest resource savings are achieved for TPC-H Q1 and Proxy Q1: 95% and 85% respectively. Moreover, for these two queries the global optimization strategy outperforms the local one by 20%-40%. From these examples, it is clear that the performance trade-offs are application dependent.

FIGS. 9A-9F compare the normalized resource usage under local and global optimization strategies when the queries process different amounts of input data (for proxy queries, x-month means that x-months of logs data are used for processing). In these experiments, w_increase was set at 10%. The results again show that the reduce task settings and related performance benefits are not only application dependent, but also depend on the amount of data processed by the application. The global optimization policy always outperforms the local one, and in some cases, the gain is significant: up to 40% additional resource savings for TPC-H Q1 and Proxy Q1 for processing smaller datasets.

Figure 10:
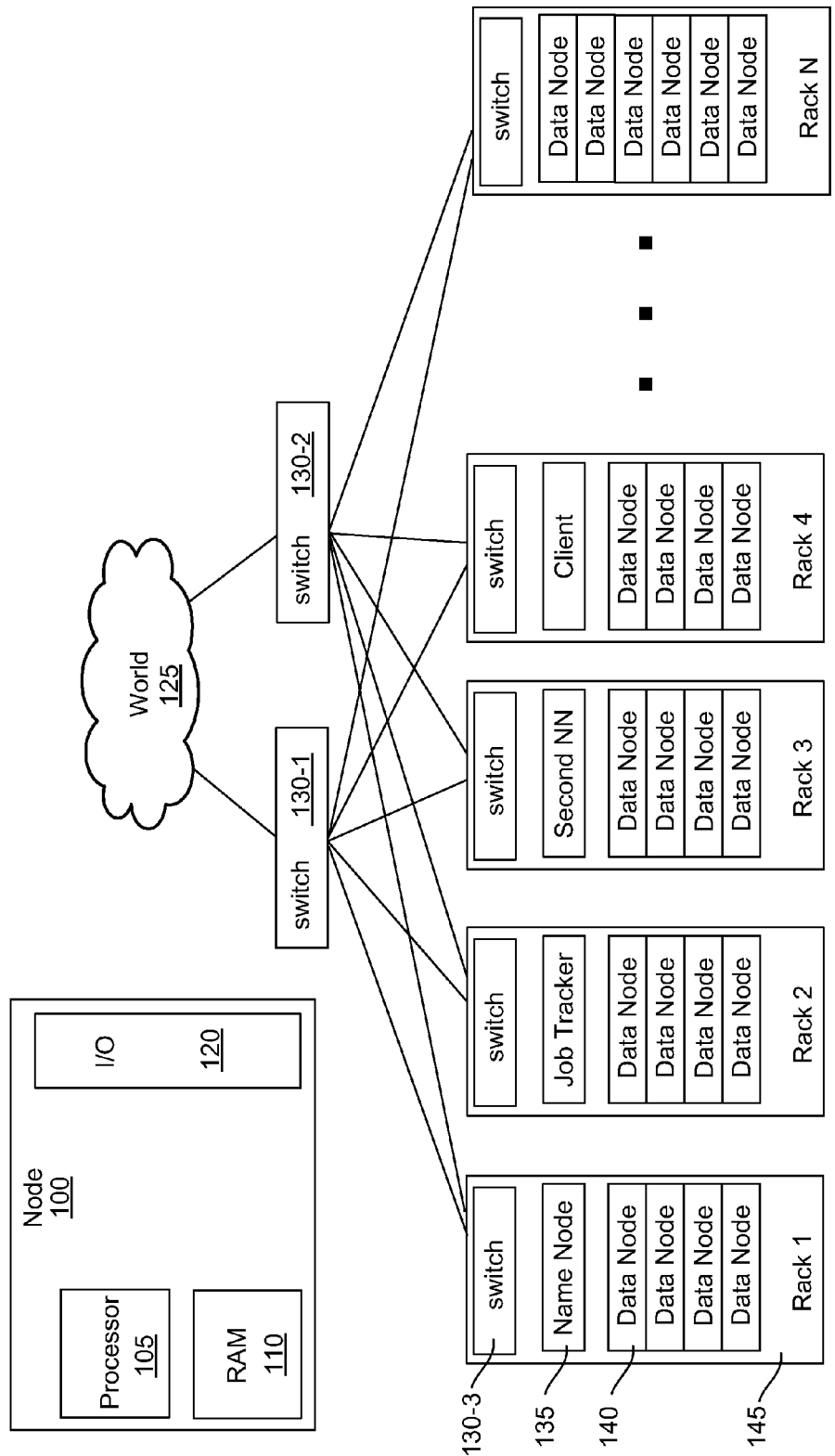
FIG. 10 is one example of a physical system for executing the principles described herein.

FIG. 10 is one example of a physical system for executing the principles describe above. A diagram of a computing node (100) is shown in the upper left hand corner. The node includes a processor (105), random access memory RAM (110), and an input/output (I/O) module (120). In the example given above, the computing nodes were HP DL145 G3 machines with four AMD 2.39 GHz cores, 8 GB RAM and two 160 GB 7.2K rpm SATA hard disks. These blade computers are setup in racks (145) and form data nodes ("workers") (140). In this example, one node is designated as a name node (135), a second node is designated as a job tracker and a third node is designated as a secondary naming node. Each of the racks includes a switch (130-3) that supports the network traffic between the nodes. For example, the switches may be gigabit Ethernet routers. There may be any number of external switches (130-1, 130-2) that connect the racks and external data sources (125) (the cloud labeled as "World" in FIG. 10). The MapReduce algorithms and techniques do not have rigid limits on the number of nodes/racks that can be used. FIG. 10 shows racks 1 to N being incorporated into the distributed computing system.

The methods, steps, algorithms and techniques described herein may be executed on one or more of the computing devices shown. For example, the models, monitoring, and optimization of the workflow settings may be performed on a single node (100) or on multiple nodes. As discussed above, the execution of the MapReduce workflow can be performed on all or only part of the available computing resources.

Figure 11:
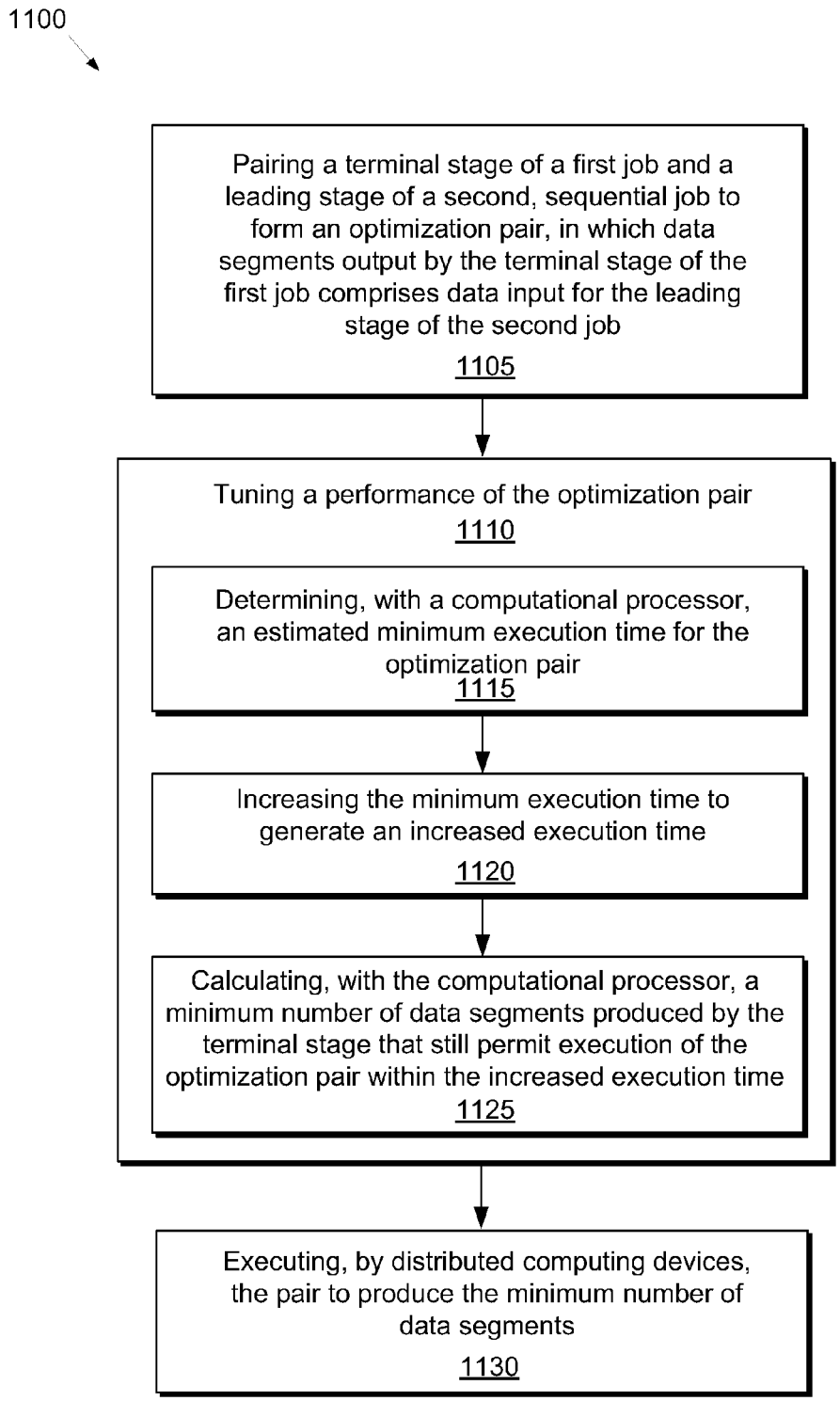
FIG. 11 is a method for optimizing execution and resource usage in large scale computing, according to one example of principles described herein.

FIG. 11 is a method (1100) for tuning workflow settings in a distributed computing workflow that includes sequential interdependent jobs, such as in a MapReduce process. The method includes pairing a terminal stage of a first job and a leading stage of a second, sequential job to form an optimization pair (1105). The data segments output by the terminal stage of the first job makes up the data input for the leading stage of the second job. For example, the reduce stage of a first job produces the input for the map stage of a second job.

The performance of the optimization pair can be tuned (1110) by determining with a computational processor an estimated minimum execution time for the optimization pair (1115). This minimum execution time is increased to generate an increased execution time (1120). The minimum number of data segments produced by the terminal stage while still permitting execution of the optimization pair within the increased execution time is calculated with the computational processor (1125).

The data to be processed is divided into the minimum number of data segments. Consequently, the amount of data to be processed and the minimum number of data segments determine the amount of data contained in each of the data segments. These data segments are each distributed to a specific node or a slot within the node. Consequently, the number of data segments determines the amount of resources used. The minimum execution time is calculated by determining an amount of data in each segment and using a platform model that defines relationships between an amount of data in a data segment (reduce task) and the completion time for each stage. By inputting the amount of data into the platform model, the completion time can be estimated.

The optimization pair is executed, by distributed computing devices (e.g., as shown in FIG. 10), to produce the minimum number of data segments (1130). The amount of data in the data segments is determined by the amount of data to be processed and the minimum number of data segments the data is divided into (e.g. the number of reduce tasks, map tasks, etc.). These data segments are distributed to various computing devices and are processed in parallel in the second sequential job.

In general, the reduction of resource usage for each pair when it is executed with the increased execution time is calculated. The pair with the highest reduction of resource usage is then selected. In one example, the minimum number of reduce tasks for a specific phase (a reduce task) can be calculated by selecting a number of reduce tasks to divide the input data into, then determining an amount of data in each reduce task. The amount of data in each reduce task is input into a platform model that relates an amount of data processed by a phase to an estimated execution time for that phase. The estimated execution time of the optimization pair is recorded and the steps of selecting a number of reduce tasks, determining an amount of data, estimating an execution time, and recording an execution time is iteratively performed with a progressively smaller number of reduce tasks until the estimated execution time for the optimization pair exceeds the increased execution time.

The model ensemble can be used to predict the performance of the distributed computing workflow when executed on the distributed computing devices and to inform tradeoffs between execution and resource usage. The model ensemble includes a platform model describing a relationship between an amount of input data and completion time for each phase, workflow settings defining a number of reduce tasks for each job and a workflow model to calculate an amount of data flowing through the jobs, given the workflow settings. The estimated completion times of the phases are calculated by inputting the amount of data flowing through the phases into the platform model.

This results in a lower execution time for the workflow. An estimated execution time for the workflow can be determined by calculating an estimated execution time for each phase in each job, summing the estimated execution time for each phase in each job to obtain the estimated execution time for each job. The estimated execution times for each job are summed to produce the estimated execution time for the overall workflow. The principles can be applied to global tuning of the distributed computing workflow by applying the processes described above to all the optimization pairs in the distributed computing work flow. Some of the pairs will be more effective in reducing resource usage than other pairs. The global optimization includes calculating a gain ratio comprising a reduction in required resources divided by an increase in execution time, in which the optimization pair with the highest gain ratio is selected to have an increased execution time. The workflow settings for the selected optimization pair are selected based on the gain ratio. The selected optimization pair is then executed with the workflow settings within the increased execution time.

In summary, many companies are on a fast track of designing advanced data analytics over large datasets using MapReduce environments. Optimizing the execution efficiency of these applications is a challenging problem that requires user experience and expertise. The principles and results shown above describe an automated framework for a proactive analysis of achievable performance trade-offs to enable an efficient workload management in a Hadoop cluster. The performance gain for minimizing a workflow completion time was found to be non-proportional. The experimental validation of this ensemble of models shows that in many cases, by allowing 5%-10% increase in the workflow completion time, there can be a savings of 40%-90% of resource usage. The ability to optimize the number of reduce slots used by the programs enables efficient workload management in the cluster.

The principles described herein may be embodied as a system, method or computer program product. The principles may take the form of an entirely hardware implementation, an implementation combining software and hardware aspects, or an implementation that includes a computer program product that includes one or more computer readable storage medium(s) having computer readable program code embodied thereon. Examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for tuning workflow settings of a MapReduce workflow comprising a series of sequential MapReduce jobs executed on a distributed computing system, each MapReduce job comprising a map task and a reduce task, the method comprising:

pairing a reduce stage of a first MapReduce job and a map stage of a second, sequential MapReduce job to form an optimization pair, in which data output of the reduce task of the first MapReduce job is data input for the map task of the second MapReduce job;

determining, with a computational processor, an estimated minimum execution time and corresponding number of reduce tasks to execute the optimization pair within the estimated minimum execution time;

tuning performance of the optimization pair by selecting an increased execution time with a minimum number of reduce tasks; and executing, on the distributed computing system, the optimization pair to produce the minimum number of reduce tasks.

2. The method of claim 1, in which tuning performance of the optimization pair comprises:

increasing the minimum execution time to generate the increased execution time; and calculating, with the computational processor, the minimum number of reduce tasks produced by the reduce stage such that the minimum number of reduce tasks permits execution of the optimization pair within the increased execution time.

3. The method of claim 2, in which calculating a minimum number of reduce tasks comprises:

selecting a number of reduce tasks to divide input data to generate an amount of data in each reduce task;

inputting the amount of data in each reduce task into a platform model that relates an amount of data processed by a stage to an estimated execution time for that stage;

recording the estimated execution time of the optimization pair; and iterating the steps of selecting, inputting, and recording for progressively achieving a smaller number of reduce tasks until the estimated execution time for the optimization pair exceeds the increased execution time.

4. The method of claim 1, in which determining an estimated minimum execution time for the optimization pair comprises:

estimating an amount of data processed by each stage in the optimization pair; and estimating a completion time for each stage using a platform model that relates the amount of data processed by a stage to an estimated execution time.

5. The method of claim 1, further comprising global tuning of the MapReduce workflow by:

pairing each group of map stages and reduce stages in the workflow to produce a plurality of optimization pairs;

calculating a reduction in resource usage for each optimization pair produced by execution of the optimization pair within the increased execution time; and selecting an optimization pair with the highest reduction of resource usage to execute with the increased execution time.

6. The method of claim 5, in which selecting an optimization pair comprises calculating a gain ratio comprising a reduction in required resources divided by the increase in execution time, in which the optimization pair with the highest gain ratio is selected to have the increased execution time.

7. A computer program product for tuning workflow settings in a distributed computing workflow comprising sequential interdependent jobs, the computer program product comprising:

a non-transitory, computer readable storage medium having a computer readable program code embodied therewith, the computer readable program code, when executed by a processor, to:

pair a reduce stage of a first MapReduce job and a map stage of a second, sequential MapReduce job to form an optimization pair, in which data output of the reduce task of the first MapReduce job is data input for the map task of the second MapReduce job;

determine, with a computational processor, an estimated minimum execution time and corresponding number of reduce tasks to execute the optimization pair within the estimated minimum execution time;

tune performance of the optimization pair by selecting an increased execution time with a minimum number of reduce tasks; and execute, on the distributed computing system, the optimization pair to produce the minimum number of reduce tasks.

8. The product of claim 7, in which tuning performance of the optimization pair comprises:

increasing the minimum execution time to generate the increased execution time; and calculating, with the computational processor, the minimum number of reduce tasks produced by the reduce stage such that the minimum number of reduce tasks permits execution of the optimization pair within the increased execution time.

9. The product of claim 8, in which calculating a minimum number of reduce tasks comprises:

selecting a number of reduce tasks to divide input data to generate an amount of data in each reduce task;

inputting the amount of data in each reduce task into a platform model that relates an amount of data processed by a stage to an estimated execution time for that stage;

recording the estimated execution time of the optimization pair; and iterating the steps of selecting, inputting, and recording for progressively achieving a smaller number of reduce tasks until the estimated execution time for the optimization pair exceeds the increased execution time.

10. The product of claim 7, in which determining an estimated minimum execution time for the optimization pair comprises:

estimating an amount of data processed by each stage in the optimization pair; and estimating a completion time for each stage using a platform model that relates the amount of data processed by a stage to an estimated execution time.

11. The product of claim 7, further comprising code for global tuning of the MapReduce workflow by:

pairing each group of map stages and reduce stages in the workflow to produce a plurality of optimization pairs;

calculating a reduction in resource usage for each optimization pair produced by execution of the optimization pair within the increased execution time; and selecting an optimization pair with the highest reduction of resource usage to execute with the increased execution time.

12. The product of claim 11, in which selecting an optimization pair comprises calculating a gain ratio comprising a reduction in required resources divided by the increase in execution time, in which the optimization pair with the highest gain ratio is selected to have the increased execution time.

13. The product of claim 11, in which selecting an optimization pair comprises:

calculating a gain ratio comprising a reduction in required resources to execute the optimization pair divided by an increase in execution time for the optimization pair; and selecting workflow settings based on the gain ratio for the optimization pair.

* * * * *